United States Patent
Hu

(10) Patent No.: US 10,987,759 B2
(45) Date of Patent: Apr. 27, 2021

(54) ADVANCED BACK-STRIKE PROTECTION PROCESS AND RELATED DEVICES FOR WATER JET GUIDED LASER PROCESS

(71) Applicant: Zhaoli Hu, Greer, SC (US)

(72) Inventor: Zhaoli Hu, Greer, SC (US)

( * ) Notice: Subject to any disclaimer, the term of this patent is extended or adjusted under 35 U.S.C. 154(b) by 494 days.

(21) Appl. No.: 15/998,245

(22) Filed: May 31, 2017

(65) Prior Publication Data
US 2019/0084083 A1    Mar. 21, 2019

(51) Int. Cl.
*B23K 26/14* (2014.01)
*B23K 26/146* (2014.01)

(52) U.S. Cl.
CPC ........ *B23K 26/1435* (2013.01); *B23K 26/146* (2015.10)

(58) Field of Classification Search
CPC .. B23K 26/1435; B23K 26/146; B23K 26/14; B23K 26/142; B23K 26/1423; B23K 26/1436; B23K 26/1437; B23K 26/144; B23K 26/1462; B23K 26/1464; B23K 26/147
USPC .................................................... 219/121.84
See application file for complete search history.

(56) References Cited

U.S. PATENT DOCUMENTS

| | | | | |
|---|---|---|---|---|
| 5,254,834 A * | 10/1993 | Johnson | ................. | B23K 26/18 219/121.72 |
| 5,356,081 A * | 10/1994 | Sellar | ................... | B23K 26/142 241/1 |
| 5,767,481 A * | 6/1998 | Graf | .......................... | D21F 7/04 162/286 |
| 6,183,348 B1 * | 2/2001 | Bingham | ................ | B24C 1/003 451/37 |
| 6,244,927 B1 * | 6/2001 | Zeng | ........................ | B23K 7/10 451/102 |
| 2003/0029845 A1* | 2/2003 | Tamura | ............... | B23K 35/0227 219/121.64 |
| 2004/0004063 A1* | 1/2004 | Merdan | ................ | B23K 26/146 219/121.67 |
| 2008/0191390 A1* | 8/2008 | Fukushima | .......... | B23K 26/146 264/400 |
| 2009/0084765 A1* | 4/2009 | Muratsubaki | ........ | B23K 26/146 219/121.67 |
| 2010/0163539 A1* | 7/2010 | Fukushima | ........ | B23K 26/0823 219/121.72 |
| 2012/0074105 A1* | 3/2012 | Okamoto | ............. | B23K 26/146 219/121.62 |
| 2012/0211476 A1* | 8/2012 | Fujiya | ................ | B23K 26/0624 219/121.67 |

* cited by examiner

*Primary Examiner* — Justin M Jonaitis

(57) ABSTRACT

When water jet guided laser drilled through the first body, there is a confined embodiment between the first body and the second body. To prevent water jet guided laser to continue in this direction and create damage on the second body, a volume vibrator is connected to the embodiment and media that filled embodiment get pumped in and pumped out from the embodiment at adjustable frequency and cycle volume. Mechanical energy is then transferred into the embodiment to generate local media vibration. The laminar flowing state of the water jet is interrupted and the laser beam confined in the water jet is dispersed. Plugging method is also involved to insure when there are multiple holes on the embodiment, there will be enough mechanical energy get transferred to the laser breakthrough location.

1 Claim, 3 Drawing Sheets

ADVANCED BACK-STRIKE PROTECTION PROCESS AND RELATED DEVICES FOR WATER JET GUIDED LASER PROCESS

FIELD OF THE INVENTION

The present invention is directed to provide a novel method and related devices to avoid back-strike damage that may happened during a machining process based on water jet guided laser. More particular, the invention is a method of generating disturbance to interrupt the water jet, in turn, disperse the laser beam power confined inside the water jet.

BACKGROUND

Water jet guided laser has been used for drilling and cutting in many industrial applications, including turbine airfoil, carbon ceramic matrix (CMC), engine fuel nozzle, medical devices . . . where precise and high quality features are needed. Usually holes, slots, low kerf cut are achieved by water jet guided laser process.

The difference of water jet guided laser vs. other regular laser systems is that laser beam of water jet guided laser is not transferred in the free space. Instead, it is confined inside a stream of water jet based on total internal reflection theory.

For laser machining, a problem that harassing many applications is back-strike damage. When laser beam cut through the first body, it will continue to transfer in the space and cause damage to the second body on its way. It is desirable to cut through the first body for design, but undesirable to cut on the second body. The undesirable cut on the second body is called back-strike damage.

For regular laser system that laser beam transfer in the free space, back-strike protection usually involved with add a backing material between the first body and the second body. The backing materials act as a sacrificial layer to protect the second body.

If the room between the first body and the back surface is open enough, a backing material can be inserted to protect the back surface after the first body has been drilled/cut through. (Citation—caterpillar patent, Oxford flushing) However, when there is no direct access to insert or inject baking material to protect the second surface, back-strike protection for regular laser system becomes a problem.

There are circumstances that room between first body and second body is hidden in complicated geometry of the product and backing material is not easy to be inserted. Therefore, special methods have been used before to inject backing material into the desired location.

However, those methods used in regular laser system machining are either complicated in operation or low repeatability and reliability to insure high yield in production.

On the other hand, water jet guided laser system is based on total internal reflection to transfer laser power, in particular, the laser is composed by numerous scattered beams that confined within water jet by total internal reflection. Once total internal reflection condition is disrupted, numerous laser beams will disperse in all directions and lose it power density for machining purpose.

One requirement to have laser transferred by total internal reflection inside the water jet is to maintain a smooth interface between water and surrounding atmosphere.

The laminar flowing status of the water jet is critical to insure smooth interface between water and surrounding atmosphere. Once the laminar flowing status of the water jet is interrupted, the efficiency of total internal reflection is impacted and laser power transferring rate is reduced.

Therefore, an instinct method to achieve back-strike protection during a water jet guided laser machining process is to interrupt the laminar flowing status of water jet between the first body and the second body.

Laminar flowing status of water jet can be interrupted by flowing air or liquid between the first body and the second body. When flow speed of the air or liquid is high enough, the laminar flowing status of the water jet will be disrupted and the laser beam will be dispersed and in turn, the second body is protected from being damaged.

However, not all products have enough access or room to allow backing material to be inserted between the first body and the second body; not all products will allow to flow air or liquid between the first body and the second body at enough speed. There is a great need to invent a more general applicable method that can insure that when water jet guided laser process is used, the second body can be protected from back-strike damage.

BRIEF SUMMARY OF THE INVENTION

The present invention comprised a process that connect the room between the first body and the second body to a volume vibrator. Therefore, the media between the first body and the second body will be pumped in and pumped out at a controlled frequency.

The media between two bodies is then generating a vibrating turbulence. Once the water jet is exposed under such a media turbulence, mechanical vibrating wave existing in media will pass the mechanical energy to the water jet. The water jet will in turn start to vibrate inside the media material. Once the water jet start to vibrate, the laminar flowing status of the water jet is interrupted and water jet will turn into a turbulence flow. The laser beam will in turn disperse with the water and concentrated power density will scatter away.

BRIEF DESCRIPTION OF THE DRAWINGS

Embodiments of the present invention are illustrated as an example and are not limited by the figures of the accompanying drawings.

The number of holes for inlet, outlet and laser drilling can be more than one, but in drawings we only draw one hole of each type to indicate the effective flow area for a whole series.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a", "an" and "the" are intended to include the plural forms as well as the singular forms, unless the context clearly indicates otherwise. It will be further understood that the terms "comprises" and/or "comprising" when used in this specification, specify the presence of stated features, steps, operations, elements and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in the commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present disclosure is to be considered as an exemplification of the invention, and is not intended to limit the invention to the specific embodiments illustrated by the figures or description below.

Figure 1:
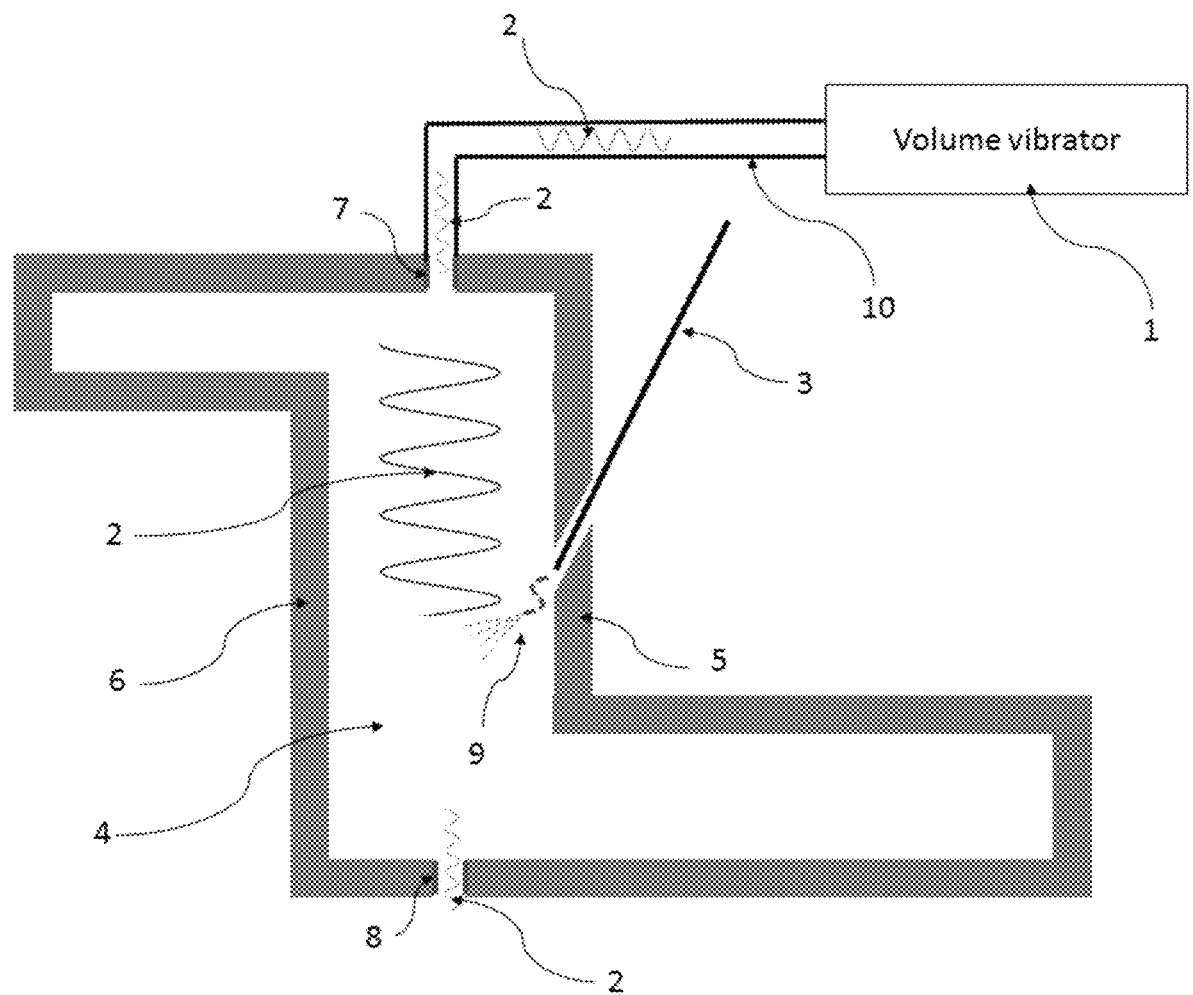
FIG. 1 depicts a volume vibrator generate mechanical vibration in the media between two bodies. The laminar flowing state of the water jet for water jet guided laser is then disrupted. The drilling location where water jet guided laser break through the first body lies between an inlet hole and outlet hole.
Figure 2:
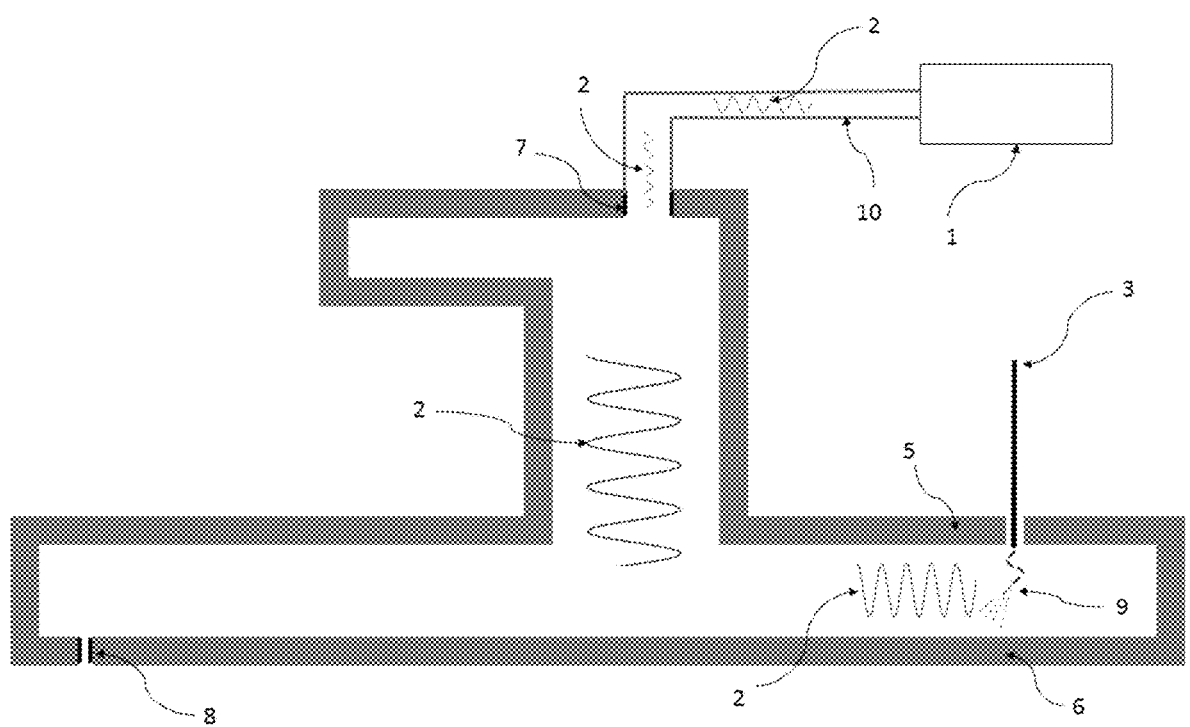
FIG. 2 depicts a volume vibrator generate mechanical vibration in the media between two bodies. The laminar flowing state of the water jet for water jet guided laser is then disrupted. The drilling location where water jet guided laser break through the first body is far from the inlet and outlet holes. The location of the inlet hole and outlet hole is also far from each other.
Figure 3:
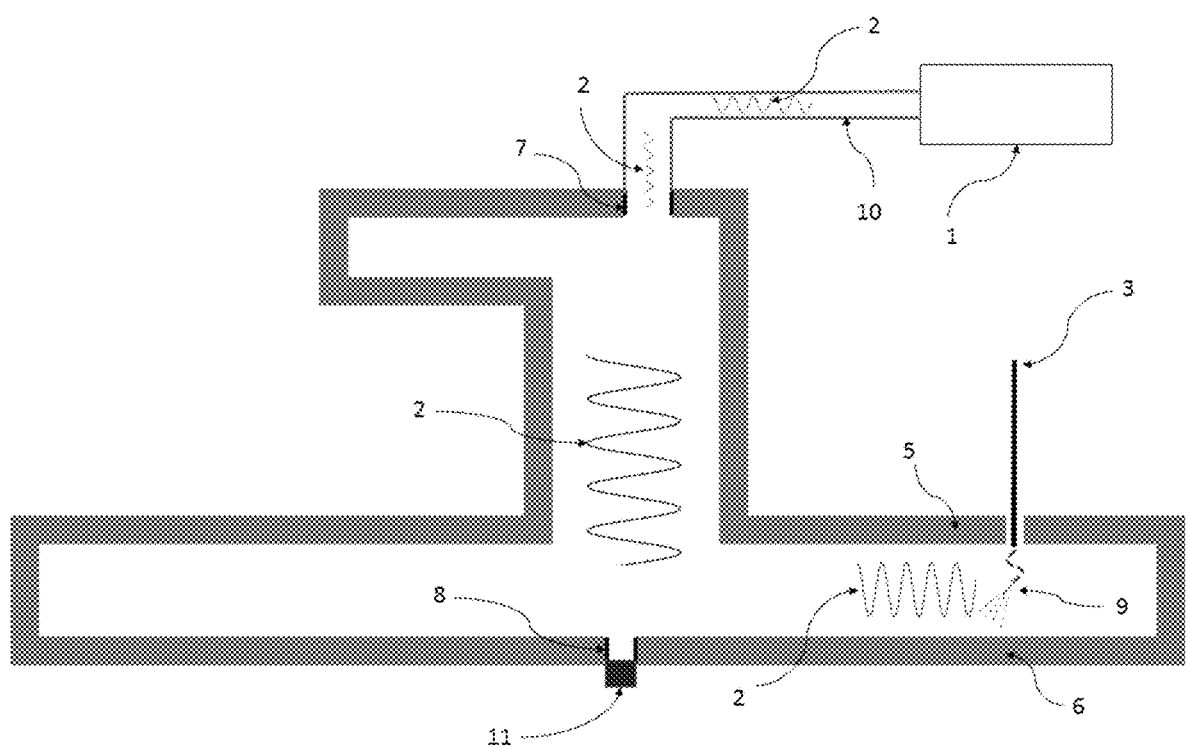
FIG. 3 depicts a volume vibrator generate mechanical vibration in the media between two bodies. The laminar flowing state of the water jet for water jet guided laser is then disrupted. The drilling location where water jet guided laser break through the first body is far from the inlet and outlet holes, but the location of the inlet hole and outlet hole is close enough to establish a high flow rate.

In FIG. 1 & FIG. 2 & FIG. 3, a volume vibrator 1 is employed and connected to the embodiment 4 under machining. A volume vibrator is defined as a device that can pump in and pump out liquid or gaseous media. For example, if embodiment 4 is filled by air, then volume vibrator can pump air out from embodiment 4 or pump air into embodiment 4. The volume vibrator 1 can be any mechanical or electrical device that can output this pump in and pump out functionality.

Based on different applications, the media that filled inside the embodiment 4 can be air, argon, water, alcohol, mixture of different liquid and solid particle suspension. We defined the media as any fluid that can be pumped in and pumped out by volume vibrator 1, its physical state can be gas, liquid, solid or mixture of different states, i.e., a solid particle suspended in the liquid or gas.

The volume vibrator 1 is connected to embodiment 4 by tubes or hose 10. The volume vibrator is defined as a mechanical and electrical device that can pump in and pump out media from embodiment. It is not limited to, but can be as simple as a cylinder driven by linear motor. The diameter and travel distance of the cylinder can be selected with respect to the volume of the embodiment. The linear motor motion frequency can also be adjusted per application. The goal is to generate enough pump enough volume media in and out at necessary frequency. The media volume being pump in and out each cycle and the frequency of the pumping cycle, plus the value of other physical properties of the media, such as density, viscosity and temperature, determined the mechanical vibration wave 2 energy get transferred into the embodiment 4 from volume vibrator 1. The mechanical wave 2 energy will be strongest at inlet hole 7, where the media enter and exit from embodiment, then attenuate as the location get further away from inlet hole 7.

The local media velocity is directly related to the mechanical wave 2 energy get transferred to this particular location. When there is enough mechanical wave 2 energy transferred to the location where water jet guided laser beam 3 break through the first body 5, local media will move at enough speed to interrupt the water jet.

In FIGS. 1, 2, 3, we give three examples to apply this method under different geometric condition. Those three examples are goaled at providing guidance of application and also showing controls and procedures included in this invention.

A theory hold in this invention is that when mechanical wave is propagating in space, it tends to avoid the path with high impedance and find its way through the path with lower impedance.

In FIG. 1, the location that water jet guided laser beam 3 break into the embodiment 4 is close to inlet hole 7, or is between the inlet hole 7 and outlet hole 8. Due to theory stated in [0031], the mechanical wave 2 generated by volume vibrator 1 will propagate from hole 7 to hole 8. Water jet 3 is disrupted and laser beam power get dispersed as scattered light 9.

In FIG. 2, the location that water jet guided laser beam 3 break into embodiment 4 is far away from the inlet hole 7. The outlet hole 8 is also far from the inlet hole 7 and diameter of hole 8 is much smaller than that of hole 7. Therefore, the impedance between hole 7 to hole 8 vs. impedance between hole 7 and laser beam breakthrough location is comparable or even higher. In this condition, the pumping frequency will be increased and pumping volume in each cycle will need to be increased.

In FIG. 3, the laser beam breakthrough location is far from inlet hole 7, but there is a direct and low impedance path between inlet hole 7 and outlet hole 8. For this condition, an orifice plug is added to plug outlet hole 8 in order to make sure that mechanical energy can be transferred to laser beam breakthrough location.

Orifice plug 11 may be replaced by other designs under different geometry and situation, as long as the impedance of the unneeded path is increased and majority mechanical energy can be transferred to the laser beam breakthrough location.

The invention claimed is:

1. A method of avoiding back-strike damage that may happen during a water jet guided laser machining processes comprising:
   providing a first body to be machined via a water jet guided laser, said first body having a plurality of walls defining an exterior surface and an interior surface, said interior surface of the first body defining a hollow interior volume;
   connecting the first body to a volume vibrator via an inlet hole located on the first body to create a mechanical energy within said hollow interior volume, said volume vibrator pumping in and pumping out a media into the hollow interior volume of said first body to create the mechanical energy via the oscillation of the media;
   providing the first body with an outlet hole may be plugged via a plug to control to ensure the vibrating media is located a laser beam breakthrough location by eliminating a path of least resistance;

filling the hollow interior volume of the first body with the media;

pumping in and out the media to the hollow interior volume to cause a vibration of the media within the hollow interior volume;

machining the exterior surface of the first body via providing the water jet guided laser which is a laminar flow to create the laser beam breakthrough location in a first portion of said plurality of walls such that when the water jet guided laser creates an opening through the first portion of said plurality of walls the laminar flow of said water jet guided laser meets the vibrating media within said hollow interior volume the mechanical energy disrupts the laminar flow of the water jet guided laser to scatter the laminar flow of the water jet guided laser such that the laser does not impinge on and start creating a deformity on a second portion of said plurality of walls defining the interior volume opposite of the first portion;

wherein the vibration of the media and plugging of the outlet hole if required ensures that the hollow interior volume is free of any dead corners such that all locations within the hollow interior volume are affected by the mechanical energy.

* * * * *